US011935509B1

United States Patent
Netherland

(12) United States Patent
(10) Patent No.: US 11,935,509 B1
(45) Date of Patent: Mar. 19, 2024

(54) PITCH-BENDING ELECTRONIC MUSICAL INSTRUMENT

(71) Applicant: Eric Netherland, Los Angeles, CA (US)

(72) Inventor: Eric Netherland, Los Angeles, CA (US)

( * ) Notice: Subject to any disclaimer, the term of this patent is extended or adjusted under 35 U.S.C. 154(b) by 496 days.

(21) Appl. No.: 17/145,196

(22) Filed: Jan. 8, 2021

(51) Int. Cl.
*G10H 1/053* (2006.01)
*G10H 1/00* (2006.01)

(52) U.S. Cl.
CPC ........... *G10H 1/053* (2013.01); *G10H 1/0008* (2013.01); *G10H 1/0066* (2013.01); *G10H 2210/195* (2013.01); *G10H 2210/325* (2013.01); *G10H 2220/161* (2013.01); *G10H 2220/241* (2013.01)

(58) Field of Classification Search
CPC .... G10H 1/053; G10H 1/0008; G10H 1/0066; G10H 2210/195; G10H 2210/325; G10H 2220/161; G10H 2220/241
USPC .......................................................... 84/626
See application file for complete search history.

(56) References Cited

U.S. PATENT DOCUMENTS 5,949,012 A * 9/1999 Ishii .................... G10H 1/0008 84/626
6,703,552 B2 * 3/2004 Haken ................. G10H 1/0555 84/718
7,619,156 B2 * 11/2009 Haken .................... G10H 1/44 84/618
7,902,450 B2 * 3/2011 Haken .................... G10H 7/008 84/645
8,173,884 B2 * 5/2012 Gatzsche ............ G10H 1/0008 84/615
8,626,324 B2 * 1/2014 Lengeling .......... G06F 3/04886 715/773
9,666,173 B2 * 5/2017 Lee ...................... G10H 1/0551
9,761,210 B2 * 9/2017 McPherson ......... G06F 3/03547
10,319,355 B2 * 6/2019 Abadi .................. G10H 1/0091
2010/0044121 A1 * 2/2010 Simon ................. G06F 3/04883 178/18.03
2014/0083281 A1 * 3/2014 McPherson ............. G06F 3/044 84/629
2017/0110101 A1 * 4/2017 Cho ........................ G10H 1/44
2018/0321841 A1 * 11/2018 Lapp .................. G06F 3/04883
2018/0350337 A1 * 12/2018 Netherland ............ G10H 1/183
2020/0251079 A1 * 8/2020 Gill ......................... G10H 1/34

FOREIGN PATENT DOCUMENTS

CA 2873237 A1 * 11/2013 ........... G10H 1/0008
JP 2016532903 A 10/2016

* cited by examiner

*Primary Examiner* — Christina M Schreiber
(74) *Attorney, Agent, or Firm* — File-EE-Patents.com; Jay A. Chesavage

(57) ABSTRACT

A musical instrument provides the ability to both automatically detect an initial note or chord played on a touchscreen, correct the initial note or chord to neutral tone or tones, as well as to "slide" the note or chord to a new location, providing a continuously variable and continuous pitch to the new location, thereby creating a new type of keyboard instrument. The keyboard is operative to initialize a series of pitch arrays, one for each key, where the pitch array value is computed to provide a lookup or translation from a pressed key into an output pitch with fine granularity which matches the granularity of resolution of the touchscreen.

25 Claims, 7 Drawing Sheets

Per-key Array Generation

Per-key process

PITCH-BENDING ELECTRONIC MUSICAL INSTRUMENT

FIELD OF THE INVENTION

The present invention relates to a musical instrument. In particular, the invention relates to a keyboard and fretboard for sliding notes over a range to generate a continuous variation in pitch over a range of actuation separators which vary in distance such as a guitar, or where the pitch change varies between equally spaced actuators with different pitch separations such as a piano or unequally spaced actuators with equal pitch increments such as frets in a guitar.

BACKGROUND OF THE INVENTION

Piano keyboards have long provided musicians with fixed frequency notes according to a tempered scale, where each note played on a mechanical string-striking mechanism causes the string to vibrate at a specific frequency based on the mass of the string, tension, and length. The fixed mechanical construction of the piano generally prevents changing the frequency of the vibrating string once struck. Electronic keyboards have more freedom to vary the frequency generated, and may include actuators on the keys to detect side motion which allow the "bending" of notes to provide effects such as vibrato, similar to the manner of a violinist or guitarist increasing or decreasing the string tension to vary the pitch. Certain musical instruments from other instrument families provide continuous pitch variation over a wide range, such as the trombone, slide whistle, Theremin, Ondes Martinot or fretless stringed instruments such as the violin, pedal steel guitar. These continuous pitch variation instruments require a level skill such the musician strike an initial note on a perfect pitch.

It is desired to provide a traditional musical interface such as a fretboard or keyboard for generation of continuously sliding notes from a neutral pitch start point to an end point which also operates as a standard keyboard when actuated keys are not sliding.

OBJECTS OF THE INVENTION

A first object of the invention is an apparatus for generating continuous pitch variations from one or more key contacts, the apparatus having a touchscreen for decoding a key position and a note processor for determining neutral pitch associated with an initial key position, and if the key position changes while depressed, the note processor thereafter converting a decoded key position into an index into a series of associated key pitch arrays, each key pitch array having associated pitch data for a decoded key position, the key processor data for each decoded key position for as long as the key is contacted.

A second object of the invention is a process for a note processor, the note processor operative to detect a key actuation and a slide to a new key, outputting pitch data until the key is released, the process:

- detecting the initial key actuation and outputting an initial neutral pitch associated with the actuated key;
- detecting a movement slide within a key position or to a different key position;
- upon detecting the movement slide, associating the new key position to an associated pitch array segment;
- outputting data associated with the pitch array segment for each newly detected actuated key position;
- optionally correcting an actuated key position to a neutral pitch after a dwell time.

SUMMARY OF THE INVENTION

In one example of the invention, an x-y touchpad has piano keyboard markings, a number of keys k, each key having an x resolution of R pixels per key, and a controller reads the x-y touchpad and determines a series of actions upon a key strike. For each of the k keys, an array of tonal data is constructed in pitch array segments which includes a neutral pitch for the key, as well as pitches in increments associated with x position which span adjacent keys, and the pitch array segments together for each key cover a desired range of available keys of pitch-bend data for smooth continuous pitch change from one key to another.

When the x-y touchpad detects a key strike and receives x-y position, a note processor decodes the key position and outputs the corresponding neutral_pitch (neither sharp nor flat) from the x-y position, outputs that pitch as data in a form such as in the Musical Instrument Digital Interface (MIDI) or Open Sound Control (OSC) protocol and thereafter monitors the key position information to determine whether the key strike position slides to a new key from its initial strike position or is released without sliding. If such slide movement is detected, the controller outputs a series of pitches of increasing or decreasing frequency according to x position read from an associated data array translating key position into tonal data.

When multiple keys are struck together such as a chord, the neutral_pitch values for each key are output on separate MIDI channels, or alternatively using the Multidimensional Polyphonic Expression (MPE) protocol of MIDI, and the key positions monitored and a change in key position detected. If the chord is slid up the keyboard, the keyboard outputs a continuous pitch translation of each note of the chord until the touch actuation as read by the x-y position decoder reaches an end point of a pitch array. The continuous update of position of the touched keys provides a data output sequence which is continuously varying until the final key positions are reached. The output of pitch data for each struck key is stopped when the key is released. In an optional variation, when a slid key stops at a destination key as determined by a dwell time, the output pitch transitions to a neutral pitch associated with the destination key. Since each key has its own array of pitch data, multiple keys can be played at a time without latency or interference, providing complete independence between the notes struck and the pitches generated.

DETAILED DESCRIPTION OF THE INVENTION

In the present specification, a value which is approximately a nominal value is understood to be in the range of one half to two times the nominal value. A value which is on the order of a nominal value is understood to be in the range of one tenth of the nominal value to ten times the nominal value. A value which is substantially a pitch value is within 3% of a nominal pitch value.

Figure 1:
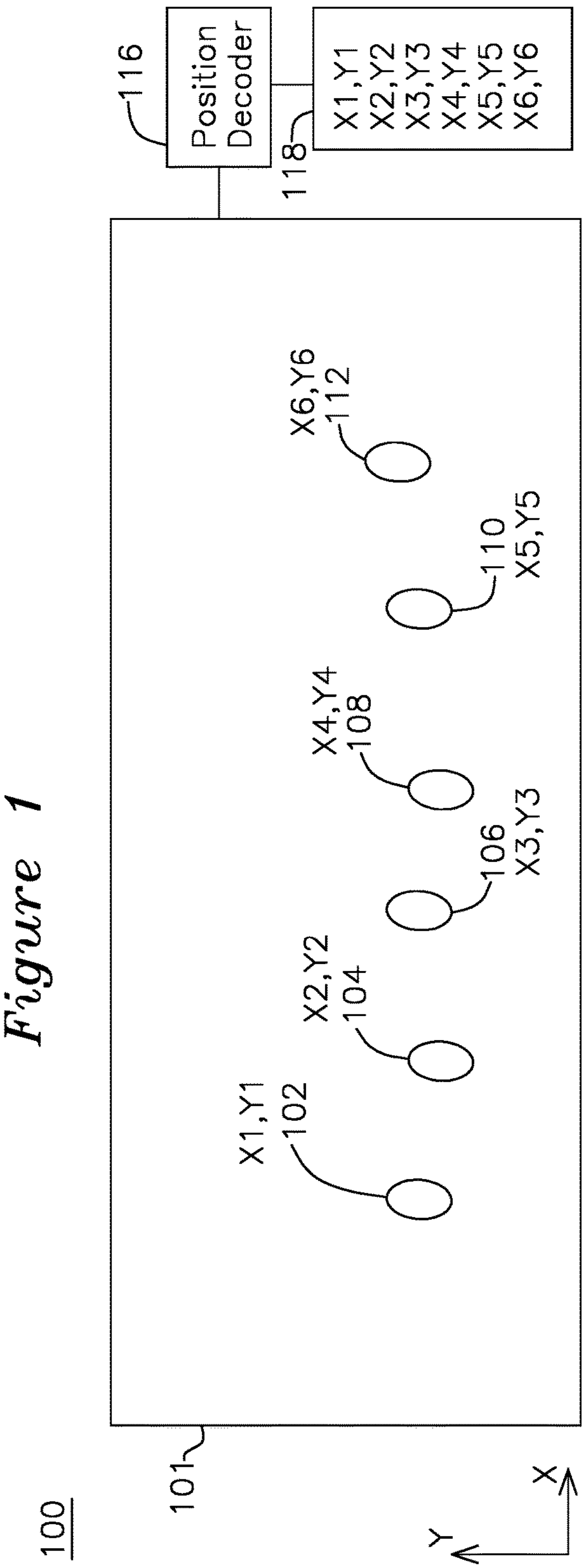
FIG. 1 shows a block diagram of an x-y position decoder.

FIG. 1 shows an x,y touchscreen system 100 comprising touchscreen 101 and position decoder 116 which generates a series of touch data events 118 in real-time. Touchscreen 101 is operative to resolve many different touched positions simultaneously, shown as X1,Y1 at position 102; X2, Y2 at position 104; X3,Y3 at position 106; X4,Y4 at position 108; X5,Y5 at position 110; and X6,Y6 at position 112. As a finger slides over the keys after making contact, the position decoder 116 outputs new detected coordinate positions indicating the movement, typically at the resolution of the touchpad, such as increments of 100 to 300 pixels per inch. Position decoder outputs detected key touch positions in real time as the data stream 118.

Figure 2:
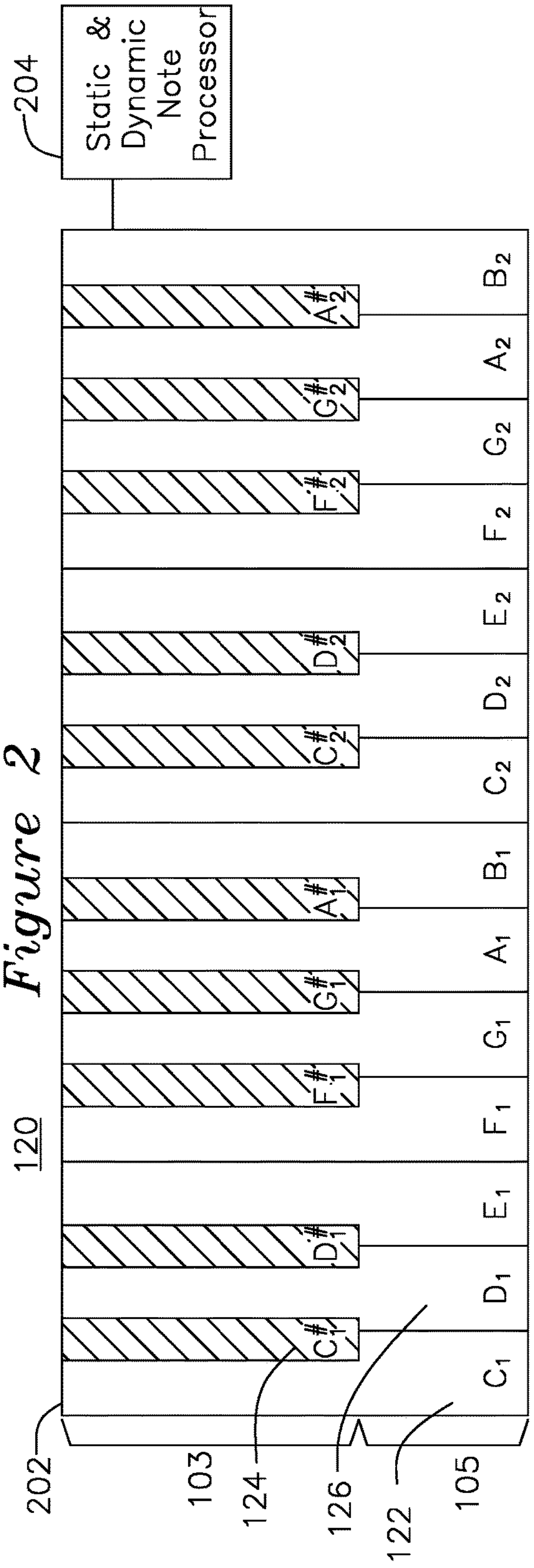
FIG. 2 an example piano keyboard outline overlaid on the position decoder of FIG. 1.

FIG. 2 shows a keyboard 120 comprising a touch sensitive array 202 such as 101 of FIG. 1 with surface markings for piano keys, indicated as the chromatic progression C1 122, C #1 124, D1 126, etc. Note processor receives X,Y position information and resolves the X,Y data to a particular note position according to an pixel resolution R with respect to a touched key, such as resolution R increments of 100 pixels over the width of a white key near the lower extent 105, and resolution R increments of 50 pixels for the width of a black key or the width of a white key in an upper extent 103. Positional information in Y is used in combination with X positional information to discern the particular current note, for example to resolve when the struck key is in the lower region 105 between 122 C1 and 126 D1 being one of the natural white keys, vs the region 103 above it corresponding to C1 #124.

Figure 3:
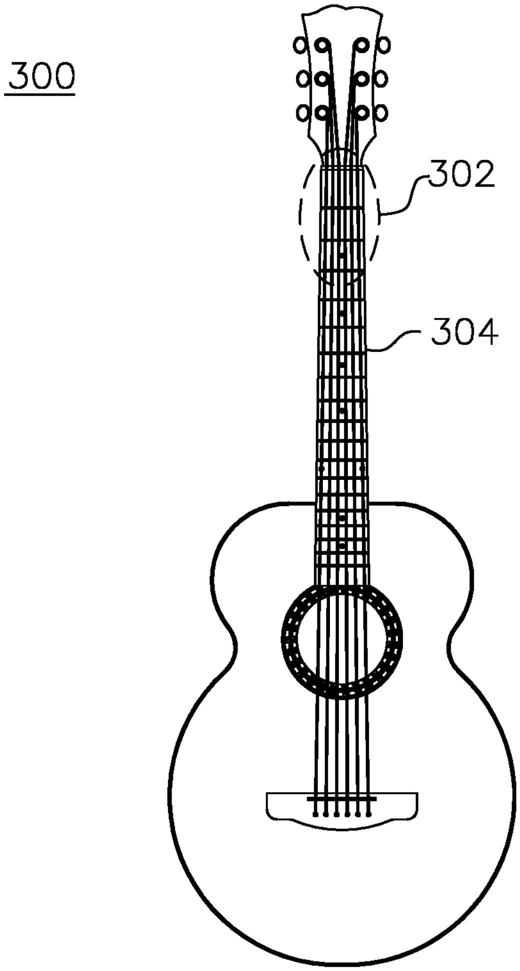
FIG. 3 shows the front view of a guitar with a keyboard according to the present invention.
Figure 3A:
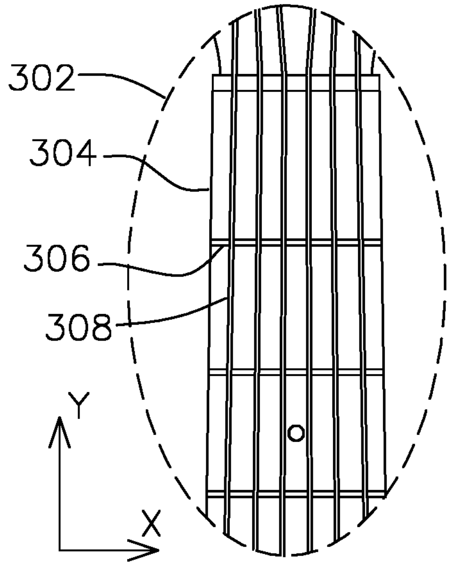
FIG. 3A shows a detail of the fretboard of the guitar of FIG. 3.

FIG. 3 shows an alternative embodiment of the touchscreen and note processor invention used with a guitar 300, where the touch array has the form factor and marking pattern of a stringed instrument fretboard 304, shown in detail 302 in FIG. 3A, indicating spatial locations of fret 306 separating fingerboard touch areas 304 and 308. As with the piano example of FIG. 2, the note processor reads the position and movement of the finger position indicating a struck note, and outputs the note and position. A string actuator such as a pressure-sensitive touchpad which determines finger or pick position, velocity, or pressure may be added to the example sensor and note processor (not shown) of FIG. 3 to further simulate string articulation, to include strumming, harmonics, or other sound effects of strings, and the x positional information used to determine which string and the y positional information which fret, thereby providing a mapping of position to musical note, as with the piano of FIG. 2.

Figure 4A:
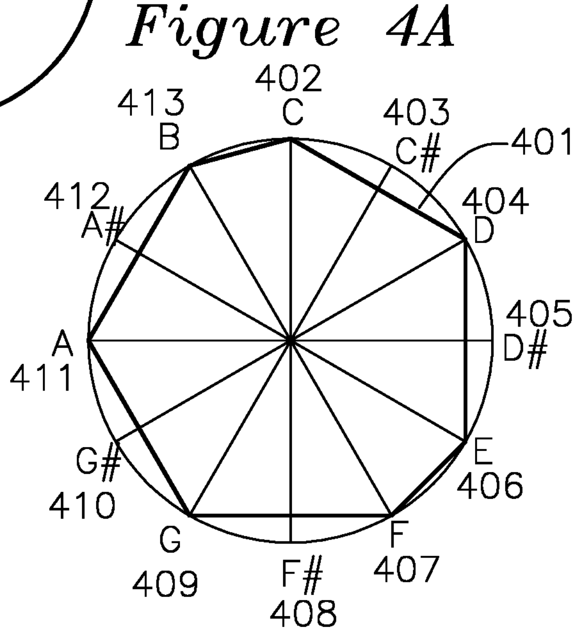
FIG. 4A shows a circular diagram for a major scale plotted on the points of a chromatic scale.

FIG. 4A shows an illustration of a semitones in a chromatic scale with line 401 showing the transitions of a major C scale indicated in individual semitones, showing the step transition from C 402 to D 404 to E 405 as two semitones per step (bypassing C #403), and the step transition from E 406 to F 407 as a single semitone. For an even tempered scale, each semitone is an exponential increase of a previous semitone, increasing by $\sqrt[12]{2}$ of the frequency of a previous semitone. The subsequent C scale transitions F 407 to G 409, G 409 to A 411, and A 411 to B are each two semitones (bypassing semitones F #408, G #410, A #412, respectively), and B 413 to C 402 (an octave above) is one semitone. Each semitone may be further divided into 100 increments known as cents. A specific problem addressed by the present invention is that when continuously changing pitch from note to note, the ear is expecting a 'linear' progression of tone pitch (which is inherently an exponential increase in frequency) over short segments of pitch. A primary difficulty is that the pitch variations on the piano for "sliding" pitches are not linear with distance, such that an equal distance transition from B to C or E to F on a keyboard represents a single semitone, whereas the equal distance subsequent transition from C to D or F to G, results in a two semitone transition. The fretboard 304 of the stringed instrument of FIG. 3 has a different problem in that the fret spacing represents the natural logarithmic progression of a stringed instrument, but each semitone has a growing separation distance, and the successively shorter distance resulting in a higher pitch value needs to be addressed.

TABLE 1

| Piano Keyboard Note | Neutral pitch as a Frequency (Hz) |
|---|---|
| C4 | 261.62 |
| C4# | 277.18 |
| D4 | 293.66 |
| D4# | 312.12 |
| E4 | 329.62 |
| F4 | 349.22 |
| F4# | 369.99 |
| G4 | 392.00 |
| G4# | 415.3 |
| A4 | 449.00 |
| A4# | 466.16 |
| B4 | 493.88 |
| C5 | 523.25 |

Figures 4B, 4C:
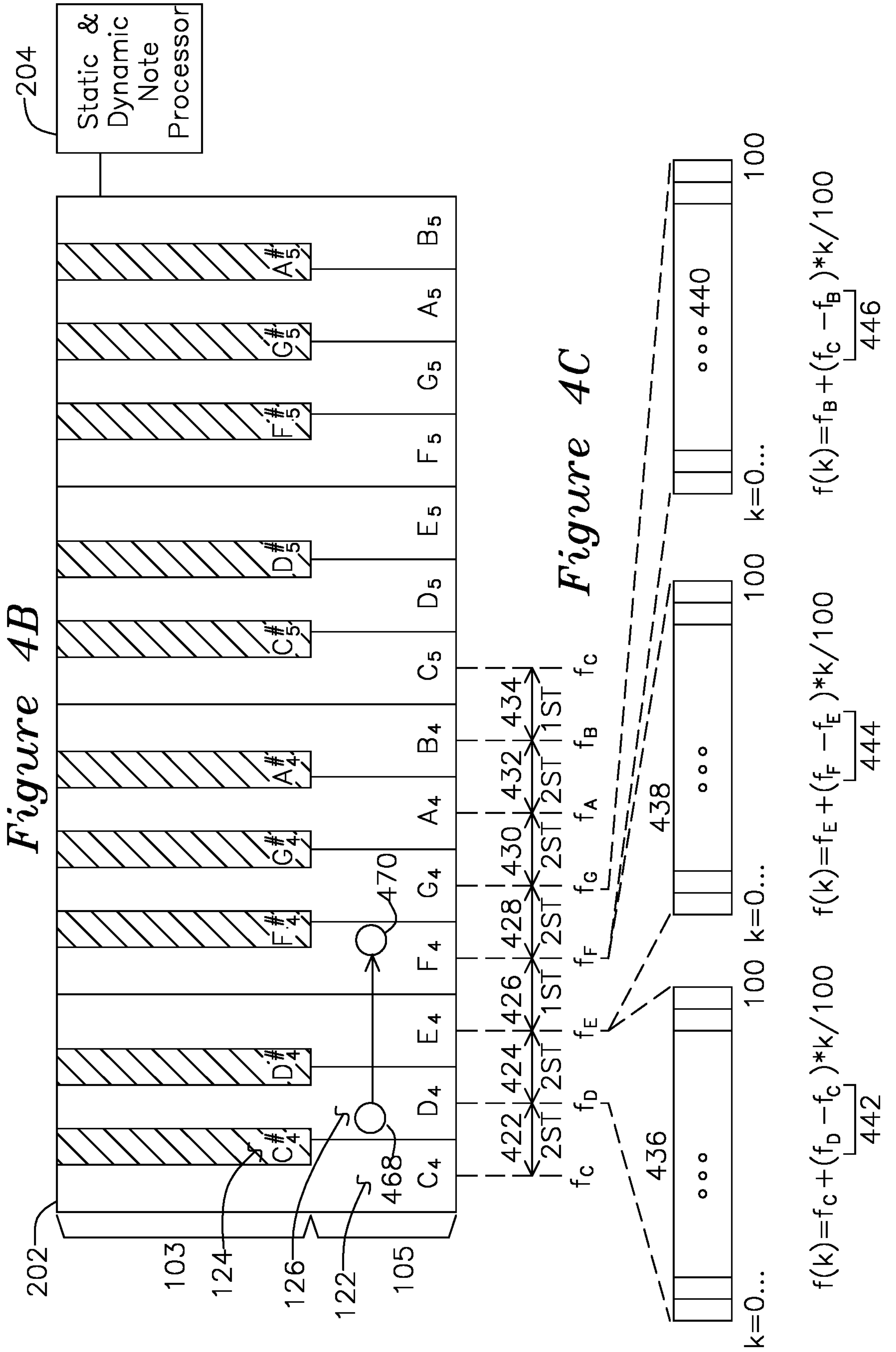
FIG. 4B shows a keyboard showing identification of keys and associated key pitch arrays.
FIG. 4C shows some of the pitch array segments associated with the D4 key of FIG. 4B.

FIG. 4B shows an example keyboard 202. Each key has an associated pitch data array (also referred to as a "pitch-bend" array), which is shown as a few adjacent data array segments of FIG. 4B for the note D4. The pitch data array for each key is initialized according to a neutral pitch according to the well-known table below showing the relationship between each key note and a frequency in the even tempered scale, and in one example of the invention, the frequency value may be stored in the array, each array representing a range of frequencies available according to a pixel resolution mapping the pixel location to a frequency in the array, the array also providing a neutral key frequency and a span of frequencies between each neutral pitch frequency. In other examples of the invention such as use with MIDI, the input device receiving the MIDI data sequence may be a synthesizer which accepts a 14 bit input which is defined to span a range, and the 14 bit values assigned particular frequencies so that the key pitch array contains only 14 bit MIDI data, which is interpreted by a synthesizer which receives it. In one example of the invention, the pitch array for each key is initialized with frequency data for understanding the invention, without limitation to the particular array data corresponding to key position, which can be stored in a wide variety of data formats, including MIDI or OSC data for use with a synthesizer.

TABLE 2

| Piano Keyboard Note | Neutral pitch as a Frequency (Hz) |
|---|---|
| C4 | 261.62 |
| C4# | 277.18 |
| D4 | 293.66 |
| D4# | 312.12 |
| E4 | 329.62 |
| F4 | 349.22 |
| F4# | 369.99 |
| G4 | 392.00 |
| G4# | 415.3 |
| A4 | 449.00 |
| A4# | 466.16 |
| B4 | 493.88 |
| C5 | 523.25 |

In one example of the invention, the note processor which reads the touchscreen first resolves the struck note to an index for use in a key pitch array segment corresponding to an adjacent key pair by center key position, shown in the present example o FIGS. 4B and 4C as ranging from 0 to 100, such that the center position of a first key D4 126 represents position 0 (D4 neutral pitch 293.66 Hz) in a key pitch array 436 spanning the D-E key center positions with the center of a subsequent E key is position 100 (and also position 0 of the subsequent key pitch array 438 representing neutral pitch E4 329.62 Hz). The initial key touch is mapped to a nearest neutral pitch corresponding to a nearest neutral pitch to a center of the initially touched key or actuation position. The pitch arrays 436, 438, 440 thereby each translate a struck key position into a corresponding pitch according to key position by indexing into the key pitch array, in the present example where pixel resolution D=100, of 1 cent of pitch per resolvable pixel position. In this manner, a finger slide from 468 to 470 results in an initial neutral pitch for a key center followed by a continuous slide in pitch from the D4 key (at a frequency fd D4 to a corresponding sharp note read by position such as 40 from pitch array 440 corresponding to a non-chromatic F4 #. Each key of the keyboard, including the black keys, has a corresponding segment of a key pitch array as shown, which is constructed according to the pixel width from center to center of the keys, and each key pitch array segment handles a neutral key change measured in semitones from one key to a next key. This change is 2 semitones (noted as 2ST) for C to D, D to E, F to G, G to A, and A to B, shown as 422, 424, 428, 430, and 432, respectively. Each key pitch array segment for E to F 426, and B to C 434 is constructed with a single semitone span (noted as 1ST). The formulas 442, 444 and 446 each provide frequency lookup information for a particular key pitch array. In one example of the invention, for a two octave (24 key) chromatic keyboard such as FIG. 4B, there will be twelve key pitch arrays with each key pitch array covering two octaves: seven black key transitions: C→D, D→E, E→F, F→G, G→A, A→B, and B→C, in addition to five black key transitions: C→C #, D #→E, F #→G, G #→A, and A #→B. In this example, where the touchscreen has a resolution of 100 pixels in X, each white key pitch array will have 100 entries for each span C-D-E-F-G-A-B-C or 800 entries for the example D4 key. The chromatic keys C4 #, D #4, F #4, G #4, A #4 will similarly have computed key pitch arrays which may be with respect to adjacent white keys (one semitone) or adjacent black keys. In another example of the invention, a single key pitch array is used for the standard key pitch arrays C→D, D→E, F→G, G→A, and an exception key pitch array is used for E→F and B→C. Computed from adjacent black keys, the corresponding formulas 442, 444, 446 (which span two, one, and two semitones, respectively) would span the number of semitones of each increment, and with respect to the pixel resolution of each physical span. In this example, the frequency span would be two semitones for each of F #4 to G #4 to A #4, and three semitones A4 # to C5 #, which would be reflected in the frequencies used for the key pitch array entries.

In an alternative embodiment for MIDI mentioned earlier, the key pitch array for each key contains indexed data entries such as a 14 bit MIDI value, and in a first step, the key pitch array would be computed for a selected synthesizer frequency span, and then pitch corrections would be made to ensure the neutral pitches corresponded to the pitches of table 1 above. These pitch corrections may address offsets from neutral pitch caused by computational errors or rounding errors.

Figures 4D, 4E:
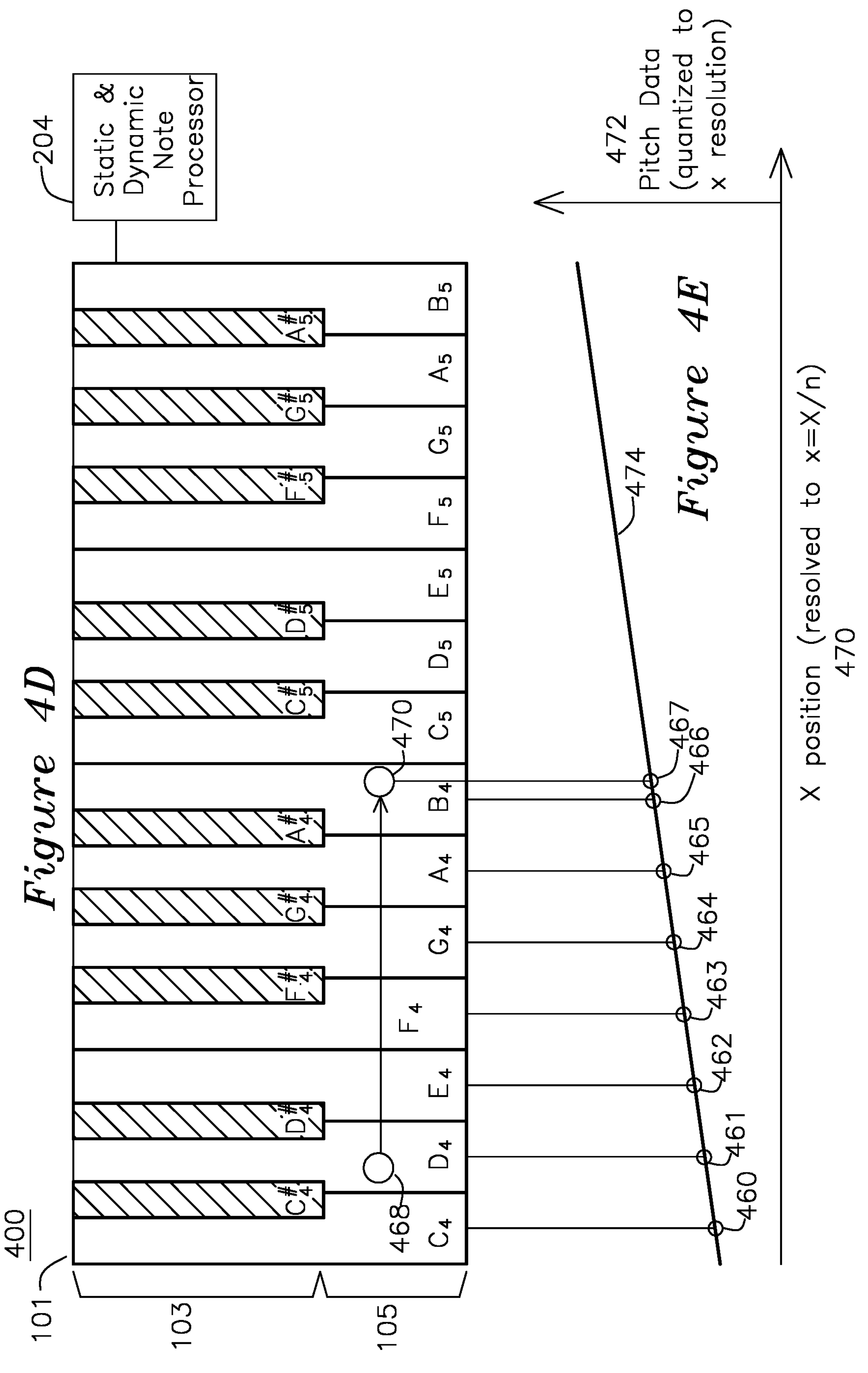
FIG. 4D is a diagram showing the relationship between struck keys and output pitch data.
FIG. 4E is a plot of pitch vs X position.

FIGS. 4D and 4E show the touch pad position vs frequency (plotted as logarithm of f ($\log_{10}(f)$) so as to present as linear) of the key pitch array entries vs frequency 472, where the X axis 470 indicates a continuum of resolved X note positions corresponding to the key positions of FIG. 4D above, at the available resolution of the x-y touchpad digitizer, including black key (sharp/flat) notes, and the Y axis 438 indicates pitch, which is quantized to the resolution of X position. As before, each key pitch array segment starts at a midpoint of one key and continues to a midpoint of a subsequent key, although other alignments are possible, as long as the key segment resolution and data output preserve the neutral pitch for an initially struck note. An initially struck note across the spatial span of several keys is resolved to the nearest key center, resulting in the output of a neutral pitch for the nearest key center. As described in FIGS. 4B and 4C, this relationship between X position 470 and pitch data 472 may be stored in a per-key pitch array indexed by X position on a one-to-one basis between resolved X key touch position (shown for the example D=100 in FIG. 4C for white keys) and output pitch. Alternatively, a sparse table of data may be stored with linear or non-linear (such as exponential) interpolation used for estimating Y pitch in the plot 474 of FIG. 4E from X key position 470 detected. In a third example of the invention, a mathematical relationship or lookup table may be provided with respect to converting a pressed key position to pitch data, and one or more per-key pitch arrays may be shared by other keys for lookup purposes. In addition to each continuous key pitch array comprised of key pitch segments such as 436 438, 440 of FIG. 4C, a supplemental key pitch array may contain only neutral pitch corresponding to the pitch of a struck key according to table 1, or it may contains pointers to the neutral pitch of the corresponding per-key pitch array segments, so that the initially stuck is always a neutral pitch before movement is detected, or to provide a traditional piano experience on a piano touch screen, so the pitch isn't changed from neutral pitch after the first key touch, or with respect to key position over time.

In this manner, the data stored in the key pitch array segments may include an initial index, pointer, or other representation to the neutral (unmodified) note initially pressed or touched, so that the piano data which is output when the key is first struck is "on key" (neither sharp nor flat, with 0 cent variance from neutral pitch) when initially played or when played without sliding notes by lateral movement. An initial off-center struck key such as 428 of FIG. 2B or 4D at key D4 will initially generate a neutral pitch data output, but if movement across the keyboard is subsequently detected after a key touch, the note processor 204 outputs a continuously updated stream of note data corresponding to current position on the keyboard without regard to neutral pitches.

Figures 5A, 5B:
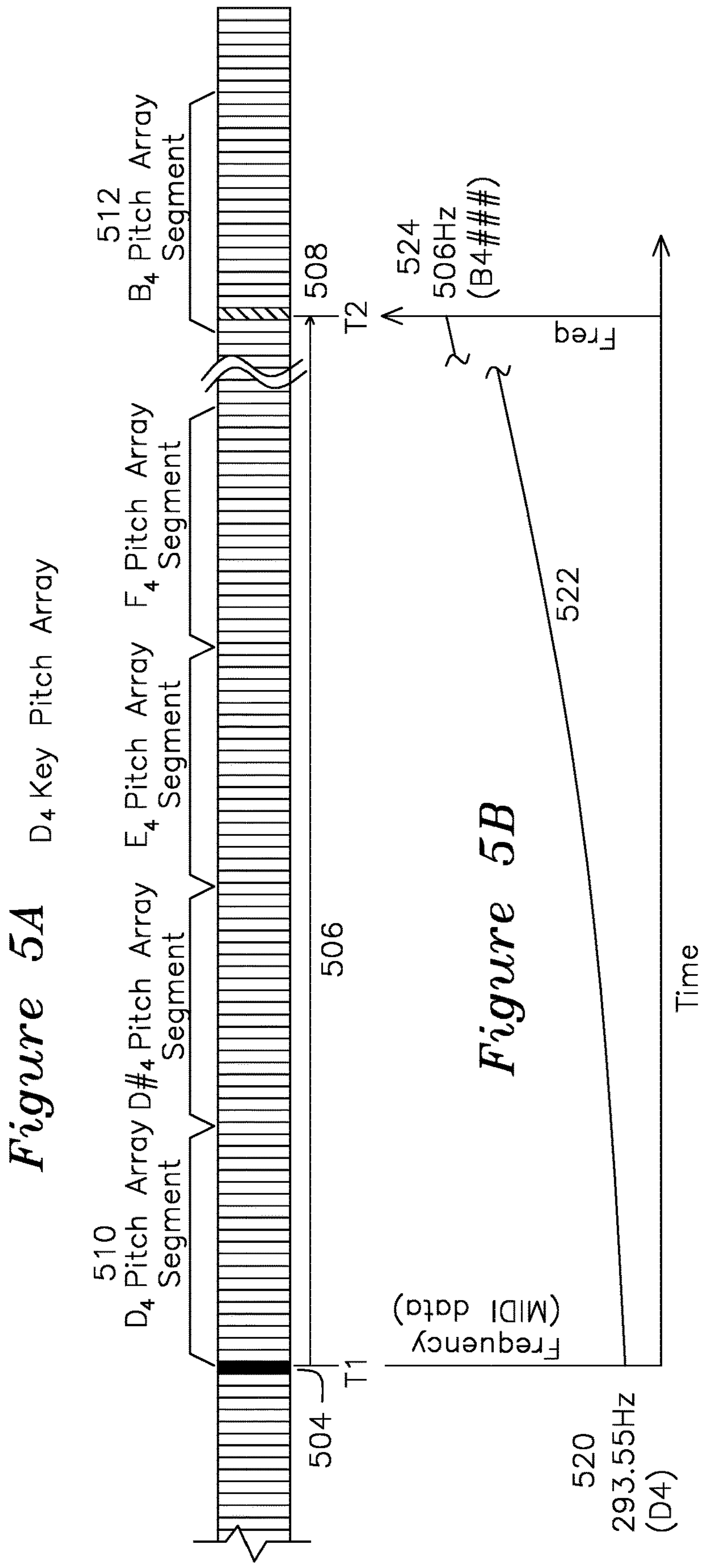
FIGS. 5A and 5B show key pitch array organization and output for a key pitch array during a slide event.

FIG. 4D provides additional detail on the operation with respect to a magnified view of FIGS. 4B and 4A. A struck key 468 which slides to position 470 of FIG. 4D results in neutral pitch data corresponding to frequency (or MIDI data) 461 selected from the key pitch array value 504 of FIG. 5A until the keypress is slid over the surface of the key region. When the keypress slide is detected from time T1 to T2, the data that is determined by the corresponding key pitch array of output data for the initially struck key (510), with the X position of the key mapped to a pitch, shown in the linear plot 522, and the keyboard is repetitively read to detect additional movement from time T1 (with associated frequency of 293.5 Hz of D4) to time T2 (with associated frequency 506 Hz of B4 ###), as the key slides to an end point which selects data from each of the key pitch array segments of the key slide until it reaches 508 of segment of B4 key pitch array (of the key pitch array associated with the starting key strike).

In one example of the invention, each key pitch array for a particular key contains pitch data for a given key. The pitch offsets may be computed a variety of different ways. In the previous computation for an example range 424 of FIG. 4B the key pitch array segment 424 corresponding to two semitones may be computed as:

$$f(i) = fc + \frac{(f_{upper} - f_{lower})}{i/D}$$

where:

- f(i) is the frequency data for a key pitch array segment by index i;
- $f_{upper}$ and $f_{lower}$ are the respective upper and lower neutral_pitch values from table 1;
- i is the index of the key pitch array to be initialized; and
- D is the resolution of the touchscreen (100 in previous examples).

In another example embodiment, the key pitch array contains MIDI data, such as a 14 bit value which is defined to match a particular range that was previously sent to the synthesizer. MIDI data has the advantage of incorporating the naturally exponential growth in pitch that the ear expects to hear, such that a key pitch array of linearly spaced pitch sub-intervals may be represented by a linear increase in MIDI data. For this approach, a similar method is used for populating the key pitch arrays for each key, however each key pitch array segment of the key pitch array is computed on the basis of number of semitones rather than specific frequencies to preserve the relationship between the generated pitch range and underlying graphic of the key (or fret) which has been actuated. For MIDI data, certain white key transitions (E to F and B to C) with one semitone are treated differently than for white keys with two semitones. In this case, the "standard key" increment for each entry of a key pitch array segment which cover two semitones (C to D, D to E, F to G, G to A, A to B) is computed as:

$$\text{standard\_pitch\_increment} = \frac{\text{neutral\_pitch}}{i * R}$$

where R is a touchscreen x resolution of a key on the touchscreen keyboard (such as 100 pixels for an x extent of a white key and 50 pixels for an x extent of a black key), and i is the range in semitones that the key pitch array spans. R is typically a fixed resolution of the touchscreen and i is typically a value chosen at the time of initialization indicating the range of pitchbend. Each entry of the key pitch array segment has neutral pitch data followed by successive increments of standard_pitch_increment for each successive entry of the key pitch array segment as computed above.

"Exception key" pitch increments cover a single semitone range (B to C and E to F). For these key pitch array segments, the first value is the neutral pitch value corresponding to that key pitch array segment, and each successive increment in pitch is computed as:

$$\text{exception\_pitch\_increment} = \frac{\text{neutral\_pitch}}{2 * i * R}$$

where R and i are defined the same as was indicated in the standard_pitch_increment formula.

Figure 6A:
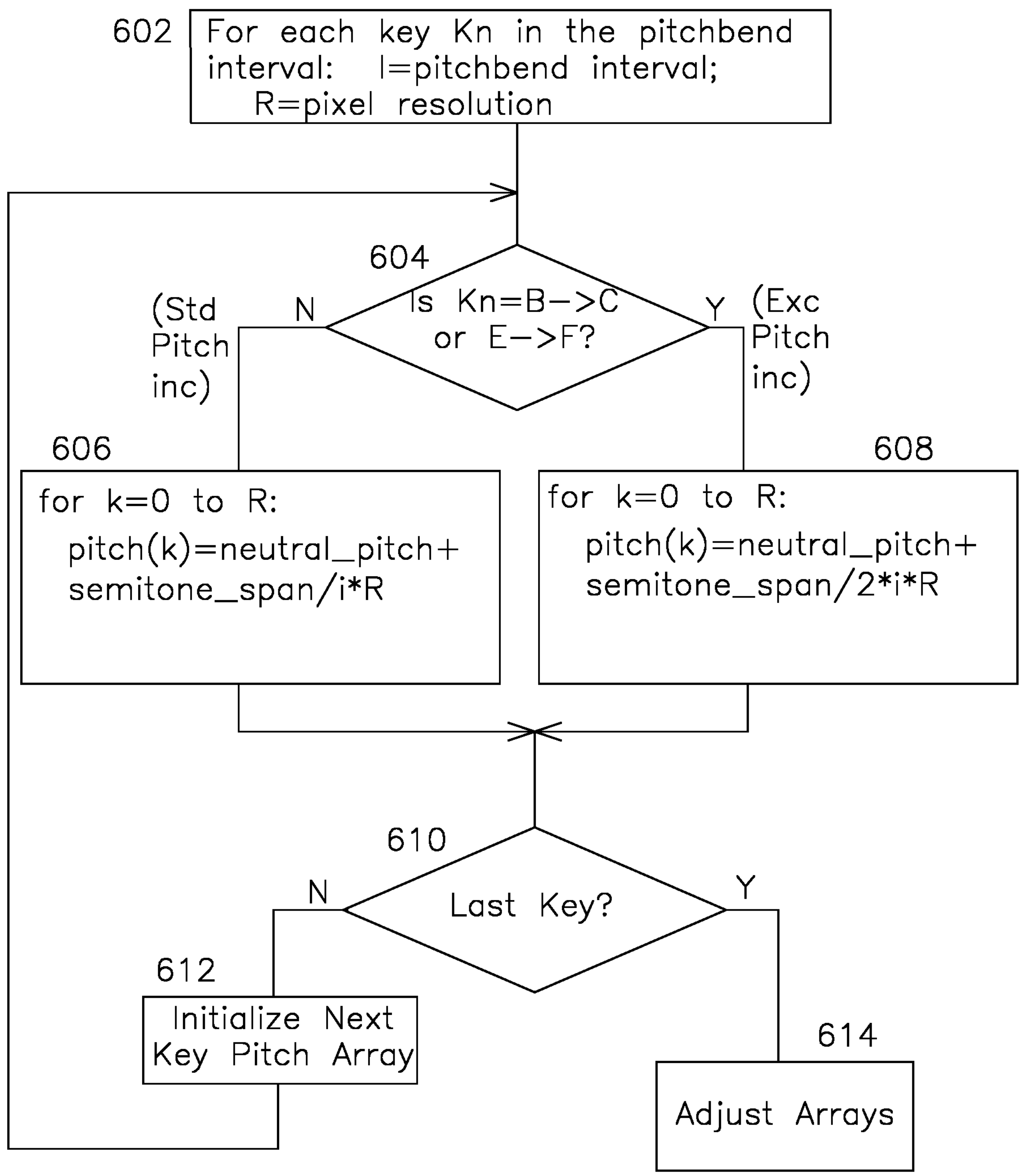
FIG. 6A shows a flowchart for initialization of key pitch arrays for a keyboard.

FIG. 6A shows a flowchart for initializing the key pitch array associated with each key of the keyboard. As described previously, key pitch array data may be pre-computed, or computed at the time of pitch-bend range selection, for example, from two to three octaves or a different sub-range of semitones, as a musician may prefer. Additionally, the number of unique key pitch arrays may vary, where each unique key has a single key pitch array for twelve unique key pitch arrays (one for each chromatic key), or seven (one for each white key), with upper or lower octaves of a key repeating the increments used in the octaves for the same key. In this manner, a reduced number of key pitch arrays may be computed. Step 602 defines the touchscreen resolution R, a quantity which is typically fixed for the digitizer touchscreen (and which may also be set equal to the number of entries in each key pitch array segment) such as 424 from C to D of FIG. 4B. The key pitch array segments such as 436, 438, 440, etc of FIG. 4C are initialized according to the frequency formulas below 436, 438, 446 for frequency data, or preferably the MIDI formulas 606 for exception keys or 608 for standard keys as described earlier as selected by number of semitones 604. The key pitch array initialization process continues for each first key of a key pitch array until the last key pitch array (typically twelve for a full chromatic set of key pitch arrays) is initialized 610, or continues until the last key pitch array is initialized. Depending on the initialization algorithm used, it may be necessary to adjust the key pitch arrays 614 to ensure the neutral_pitch values are exact). In one example of the invention, the white keys have on the order of R=100 X positions of resolution per key, and the black keys have on the order of R=50 X positions of resolution per key.

Figure 6B:
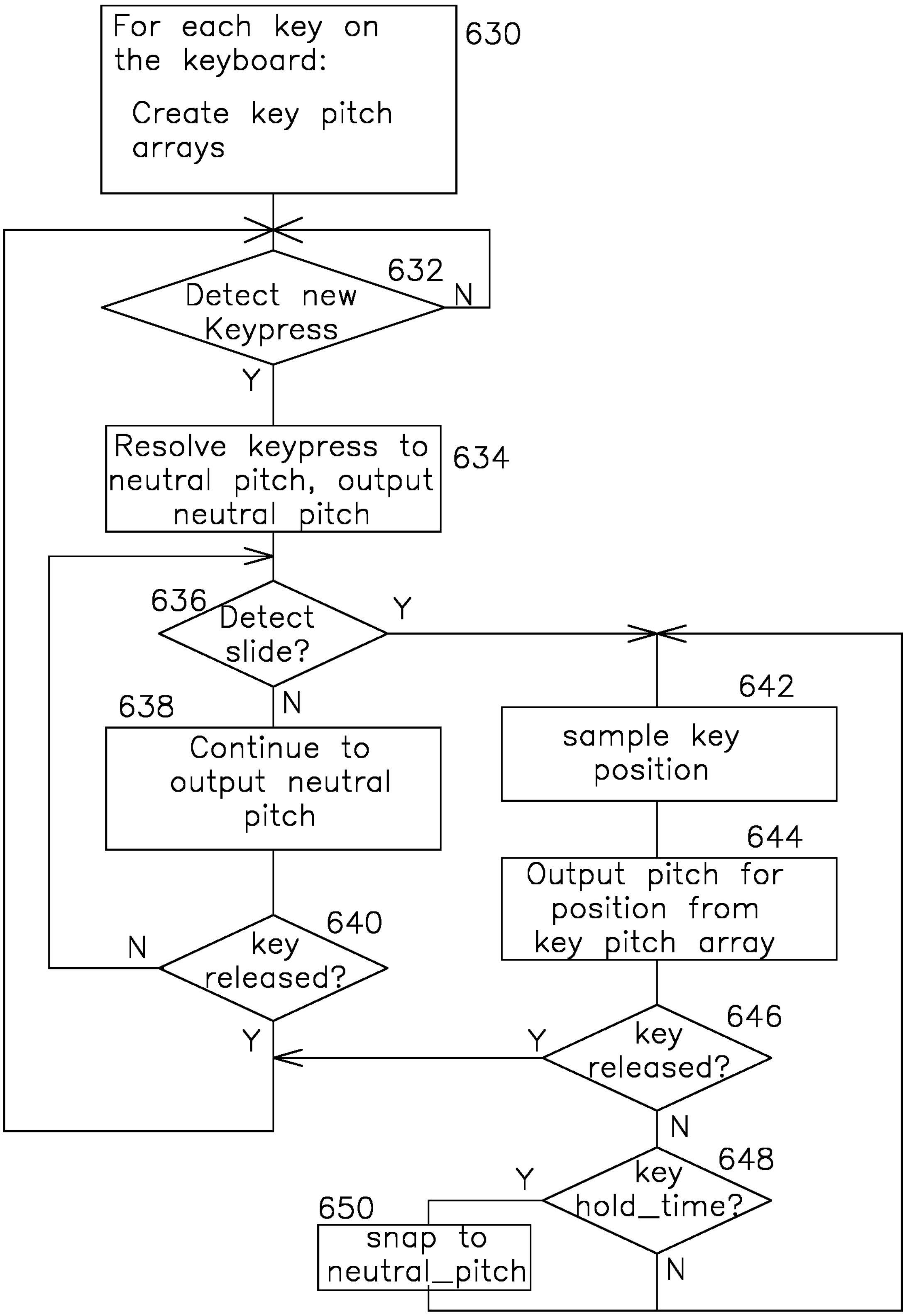
FIG. 6B shows a flowchart for operation of a key pitch array for a keyboard.

FIG. 6B shows a per-key process for outputting pitch data, where each key may be independently handled by separate processes, or the keys may be handled together by a single process. Step 630 describes the previous initialization of FIG. 6A, which may be necessary to repeat if the pitch-bend interval is selected to be a different range. When a new keypress event is detected 632, the keypress is resolved into an initial neutral pitch 634, and if sliding in the x direction is detected 636, the process samples the key position 642 and outputs a pitch for that position 644 using the per-key pitch array value associated with the current key position 642, and continues to do so until the key is released 646. If no slide is detected 638, the next neutral pitch is selected. In one example of the invention, the pitch output data transitions to the neutral_pitch value 650 after a dwell time interval of time 648 such as after a time duration of approximately 1-5 ms, or alternatively anywhere in the range of 1 ms to ms. In one example of the invention, the elapsed time for the pitch transition from current key position to neutral pitch may be on the order of 1 ms per pitch array entry. This provides the ability for a chord played and slid to a new position to transition to the corresponding neutral pitch of the new key position at a slide endpoint (or midpoint) without individual adjustment of key touch position for intonation of individual notes because of the spatial key offset from center resulting in an output of on-neutral (off-pitch) tones.

The touchscreen functionality as described herein may be augmented by other supplemental controls. For a small keyboard touchpad with corresponding keyboard graphics showing the key outlines, an additional set of controls may be added. For example, a touchpad configuration may have a first touchscreen comprising the previously described x,y touchpad with key display for the keyboard and pitch aspects, the first touchpad accompanied by a second touchpad or controls which may modify the timbre, pitch, volume, harmonics, or add percussive effects. For example, the second touchpad may provide volume control with y movement and pitch control with x movement which modifies the amplitude and/or pitch of the first touchpad. Alternatively, tapping on the second touchpad may gate on and off the selected pitches from the first touchpad, such as by providing an increasing and decreasing amplitude envelope.

The preceding description provides detailed implementations for piano for clarity in understanding the invention and not intended to limit the invention to only those given embodiments. The approaches described herein may be more generally applied to any musical instrument virtual interface which has actuators or sensors of any kind (such as frets, harmonica holes, timpani membranes, or actuators of a woodwind, stringed, or percussion instrument) where the instrument produces discrete neutral pitches and the actuators are separated by varying physical distance separations. For any of these types of musical instruments with discrete neutral pitches and fixed varying separation distances between them, a touchpad sensor with at least one axis of separation measurement may be used in combination with a key pitch array constructed as described in FIG. 4C or the previous examples to provide a virtual version of that musical instrument which provides continuously variable pitch.

In one example of the invention, each of the key pitch array segments of a key pitch array contain data such as 14 bit values indicating a pitch known to a MIDI instrument, and the key pitch array data is output as MIDI data to a device such as a synthesizer. In another example of the invention, each of the entries of a key pitch array contain pitch data which is transmitted to a reproduction device.

I claim:

1. An apparatus for generating a stream of pitch data from one or more touches, the apparatus comprising:

a plurality of key pitch arrays, at least one key pitch array containing pitch data;

a touchscreen for decoding one or more touches of the touchscreen into corresponding touch positions, each touch position associated with a key pitch array;

a note processor coupled to the touchscreen and to the plurality of key pitch arrays, the note processor initially outputting a nearest neutral pitch of an associated key pitch array for an associated touch position;

during an interval when the note processor detects a change in position of a touch, the note processor thereafter converting each decoded touch position into corresponding pitch data from the associated key pitch array and transmitting the corresponding pitch data as an output;

when the note processor detects a release of touch, the note processor no longer outputting the corresponding pitch data for the touch.

2. The apparatus of claim 1 where the touchscreen further comprises visual indications corresponding to touch positions, and each key pitch array contains an entry corresponding to neutral pitch data at a center position of each said touch position, the associated key pitch array also containing pitch data which comprises monotonically increasing pitch data for touch positions on one side of the center position and monotonically decreasing pitch data for touch positions opposite the one side of the center position.

3. The apparatus of claim 1 where a resolution of the touchscreen between key touch centers is equal to a number of entries in a corresponding segment of an associated key pitch array.

4. The apparatus of claim 1 where a spatial separation distance between regions of the touchscreen corresponding to neutral pitches of the associated key pitch array is a constant and a number of semitones between neutral pitches is either one semitone or two semitones.

5. The apparatus of claim 1 where the touchscreen further comprises visual indicators of touch positions associated with each key pitch array, and neutral pitches of each associated key pitch array correspond to at least one of: a piano, a guitar, or actuators of a woodwind, stringed, or percussion instrument.

6. The apparatus of claim 1 where each nearest neutral key position of the touchscreen has an associated key pitch array or an associated key pitch array segment.

7. The apparatus of claim 1 where each particular key pitch array of the plurality of key pitch arrays comprises a plurality of key pitch array segments, at least one particular key pitch array segment for adjacent touch positions spanning a single semitone starting from a neutral pitch to a subsequent neutral pitch, each sequential entry of the particular key pitch array segment having an incremental value of substantially $$\frac{\text{neutral\_pitch}}{2*i*R}$$

different than a previous entry of the particular key pitch array segment.

8. The apparatus of claim 1 where the associated key pitch array comprises a plurality of key pitch array segments, each key pitch array segment having entries including a particular current entry and a corresponding previous entry, at least one key pitch array for adjacent keys covering two semitones starting from a neutral pitch to a subsequent neutral pitch, each particular current entry of the associated key pitch array segment having an incremental value of substantially $$\frac{\text{neutral\_pitch}}{i*R}$$

different than the corresponding previous entry of the key pitch array segment and where i is an index of the associated key pitch array segment.

9. The apparatus of claim 1 where the associated key pitch array comprises a plurality of key pitch array segments, each key pitch array segment spanning a first neutral pitch fc having a frequency $f_{lower}$ and a second neutral pitch having a second frequency $f_{upper}$, the touchscreen having a number D of units of resolvable touchscreen positions in the key pitch array segment, each key pitch array segment containing frequency data according to approximately $$f(i) = fc + \frac{(f_{upper} - f_{lower})}{i/D},$$

where i is an index into the key pitch array segment.

10. The apparatus of claim 1 where the touchscreen further comprises visual indications for a piano keyboard, the visual indications corresponding to a visual appearance of at least one octave of a piano keyboard outline.

11. The apparatus of claim 1 where the touchscreen further comprises visual indications for a fretboard, the visual indications including individual frets with fixed or varied fret-to-fret spacing, each fret associated with a key pitch array and having a neutral pitch corresponding to pitch array data for a fret position touch.

12. The apparatus of claim 1 where the touchscreen has a fixed spatial separation between touch positions which include a center touch position, each center touch position of each fixed spatial separation corresponding to an associated neutral pitch.

13. The apparatus of claim 12 where each pair of adjacent said center touch positions has associated neutral pitches that are separated by one semitone or two semitones.

14. An apparatus for generating a stream of pitch data from one or more touches of a touchscreen, the apparatus comprising:

- the touchscreen configured to convert one or more touches of the touchscreen into touch positions having coordinate positions, the touchscreen indicating a plurality of regions of touch;
- a plurality of key pitch arrays, each key pitch array associated with one of said touchscreen regions, each key pitch array containing a correspondence between coordinates on a touchscreen region and pitch data;
- a note processor coupled to the touchscreen and to the plurality of key pitch arrays, the note processor initially outputting a nearest neutral pitch associated with each touch position of a touch region;
- during an interval when the note processor detects a change in position of a touch, the note processor thereafter converting each touch position into corresponding pitch data from an associated key pitch array and transmitting the corresponding pitch data as an output;
- whereby the note processor stops the transmission of the corresponding pitch data as an output when the note processor detects a release of said touch.

15. The apparatus of claim 14 where the touchscreen has visual markings indicating a plurality of regions, the plurality of regions further comprising equally spaced regions over an elongate axis of the touchscreen.

16. The apparatus of claim 14 where the plurality of regions are arranged as a piano key layout, and each region of the piano key layout has an associated pitch data array.

17. The apparatus of claim 14 where the plurality of regions comprises unequally spaced regions over an elongate axis.

18. The apparatus of claim 14 where two adjacent touchscreen regions are associated with two corresponding pitch data arrays, each of the corresponding pitch data arrays having a corresponding neutral pitch, and where the corresponding neutral pitch for each of the corresponding pitch data arrays are separated in pitch by either one semitone or two semitones.

19. The apparatus of claim 14 where the note processor causes a neutral tone to be output for a key pitch array following a dwell time after a touch associated with the key pitch array.

20. An apparatus for generating a stream of pitch data from one or more touches of a touchscreen having regions indicated by region indicators, the apparatus comprising:

- the touchscreen configured to convert one or more touches of the touchscreen in a particular region having region indicators into associated touch positions having coordinates;
- a plurality of key pitch arrays, each key pitch array associated with one of said touchscreen regions, each key pitch array containing a correspondence between coordinates on a touchscreen region and pitch data;
- a note processor coupled to the touchscreen and to the plurality of key pitch arrays, the note processor initially outputting a nearest neutral pitch associated with each region of a touch position;
- during an interval when the note processor detects a change in position of a touch, the note processor thereafter converting the coordinates for an associated touch position into corresponding pitch data from an associated key pitch array and transmitting the corresponding pitch data as an output;
- whereby the note processor stops the transmission of the corresponding data as an output when the note processor detects a release of the touch.

21. The apparatus of claim 20 where the region indicators are at least one of a fretboard, a keyboard, a piano, a guitar, or actuators of a woodwind, stringed, or percussion instrument.

22. The apparatus of claim 20 where the associated key pitch array comprises a plurality of key pitch array segments, at least one key pitch array for adjacent keys covering a single semitone starting from a neutral pitch to a subsequent neutral pitch with a touchscreen having a resolution R, each entry of the key pitch array segment having an incremental value $$\frac{\text{neutral\_pitch}}{2*i*R}$$

where i is an index of an entry of the key pitch array segment.

23. The apparatus of claim 20 where the associated key pitch array comprises a plurality of key pitch array segments, at least one key pitch array for adjacent keys covering two semitones starting from a neutral pitch to a subsequent neutral pitch with a touch screen having a resolution R, each key pitch array segment having a plurality of entries, each entry of the key pitch array segment having an incremental value $$\frac{\text{neutral\_pitch}}{i * R},$$

where i is an index of an entry of the key pitch array segment.

24. The apparatus of claim 20 where the associated key pitch array comprises a plurality of key pitch array segments, each key pitch array segment spanning a first neutral pitch fc having a frequency $f_{lower}$ and a second neutral pitch having a second frequency $f_{upper}$, the touchscreen having R units of resolvable touchscreen positions in the key pitch array segment, each key pitch array segment containing pitch date as frequency data according to $$f(i) = fc + \frac{(f_{upper} - f_{lower})}{i/D},$$

where i is an index into pitch entries of the pitch array segment.

25. The apparatus of claim 20 where the output comprises data compliant with at least one of a Musical Instrument Data Interface (MIDI) specification or an Open Sound Control (OSC) protocol.

* * * * *